United States Patent Office 3,397,079
Patented Aug. 13, 1968

3,397,079
HEAT-SEALABLE POLYOLEFIN FILM COATED WITH A PLASTICIZED VINYLIDENE CHLORIDE COPOLYMER
Chauncey C. De Pugh, Levittown, Pa., and Ronald F. Snyder, Bordentown, N.J., assignors to Thiokol Chemical Corporation, Bristol, Pa., a corporation of Delaware
No Drawing. Filed Aug. 28, 1963, Ser. No. 305,193
6 Claims. (Cl. 117—122)

ABSTRACT OF THE DISCLOSURE

Oriented polyolefin films having at least one surface coated with a coating composition which has a softening point lower than that of the polyolefin film and which consists essentially of (i) from about 80 to 99 percent by weight of a vinylidene chloride copolymer derived from the interpolymerization of 75 to 95 mole percent of vinylidene chloride and 5 to 25 mole percent of an $\alpha,\beta$-unsaturated carboxylic acid, and (ii) from 1 to 20 percent by weight of a plasticizer for the vinylidene chloride copolymer, may be heat-sealed without substantially altering the molecular orientation of the polyolefin in such films.

---

The present invention relates to a novel process for coating oriented polyolefinic substrates, particularly film substrates, and the resulting coated materials. The term "oriented" as used herein means materials that are oriented (i.e., stretched and quenched in the stretched position) in one or both directions and referred to in the trade as uniaxially oriented for materials stretched in one direction only and biaxially oriented for materials stretched in both directions.

Solid, high molecular weight polyolefin resins are used commercially in the form of film, piping, containers, etc., for applications in which the resins come in contact with various liquids or moist objects such as food. Polyolefin as used herein refers to homopolymers and copolymers of olefinic monomeric materials such as ethylene and propylene. The film applications are of special commercial importance because of the moisture vapor transmission properties of oriented polyolefins, and especially oriented polypropylene film, i.e., the oriented film restricts the transmission of water vapors to a greater extent for a given film thickness than unoriented film. Moreover, biaxially oriented polyethylene film exhibits an increase in tensile strength over unoriented film. These oriented films, however, when used for food packaging applications, suffer from several drawbacks in that they are somewhat permeable to certain gases such as oxygen, nitrogen, etc., as well as to oils and greases. They also cannot be heat sealed using the heated jaw type of sealer without destroying the orientation of the films, which orientation is to a large extent responsible for the film's moisture vapor transmission and tensile strength properties. Polypropylene film, moreover, is also soluble to some extent in various aromatic and aliphatic solvents which somewhat limits the utility of such films.

An object of the present invention, therefore, is to provide a clear coating for oriented polyolefin films which can be heat sealed at a temperature sufficiently low so as not to disturb the orientation and dimensional stability of the substrate resin.

Another object of the present invention is to provide such a clear, heat sealable coating for polyolefin films which is somewhat less soluble in aromatic and aliphatic solvents.

A still further object of this invention is to provide a clear, heat sealable coating for oriented polyolefin films which imparts to said film a barrier coating which provides gas impermeability and grease and oil resistance.

It has been unexpectedly found, according to the present invention, that oriented polyolefin substrates can be coated with a clear, heat sealable coating which provides gas impermeability and grease and oil resistance if the substrate is coated on one or both sides thereof with a composition comprising about 80 to 99% by weight of a polymer which is the reaction product of vinylidene chloride and one or more $\alpha,\beta$ unsaturated monocarboxylic acids or anhydrides thereof and about 1 to 20% by weight of one or more plasticizers which impart a melting point or softening temperature to the copolymer coating lower than that of the softening temperature of the oriented polyolefin subsrate itself, i.e., about 250° F. for polyethylene and about 300° F. for polypropylene.

The vinylidene chloride copolymers of the present invention are relatively low molecular weight particulate materials which contain about 75 to 95, and preferably about 85, mol percent of vinylidene chloride and about 5 to 25, and preferably about 15, mol percent of at least one unsaturated $\alpha,\beta$ carboxylic acid such as acrylic, methacrylic, itaconic and crotonic acids or anhydrides of such acids. They are random copolymers which are soluble in selected solvents such as tetrahydrofuran, ethyl acetate, acetone, methyl ethyl ketone, methyl isobutyl ketone, dimethyl formamide and dioxane nad cosolvent systems such as those containing at least 50% by volume of tetrahydrofuran and at least one solvent diluent such as toluene and methylene chloride.

The copolymers are preferably formed by means of a free radical polymerization reaction using about 0.1 to 4.0% by weight of a catalyst such as azobisisobutyronitrile or benzoyl peroxide. The reaction is preferably conducted in solution in a solvent such as hexane, methyl isobutyl ketone, methyl ethyl ketone, acetone or 50/50 (by volume) acetone/toluene. The polymerization reaction may also be conducted using suspension and emulsion polymerization techniques. The copolymers produced should preferably be as free as possible of heavy metal contaminants, such as iron, for stability purposes.

If a packaging film does not possess heat sealable characteristics, its utility in the field is sharply curtailed. Oriented polyolefin films, and particularily oriented polypropylene films, can be heat sealed. The heat required to do so, however, also destroys the orientation of the film. The resultant material somewhat loses its impermeability properties and the film is weakened at the bond line. It has been unexpectedly found, according to the present invention, that by the incorporation of one or more of the plasticizers described herein in the copolymer system described above, the coated polyolefinic film can be heat sealed at a temperature sufficiently low to enable the polyolefin film to retain its orientation and therefore its favorable properties. The plasticizers used in this system, therefore, in combination with the copolymer, must exhibit a melting point or softening temperature lower than that of the substrate itself. Plasticizers which can be used according to the present invention include triethyl citrate, acetyl tributyl citrate, dioctyl sebacate, dioctyl phthalate, glycerol triacetate, acetyl triethyl citrate, monocresyl diphenyl phosphate, butyl benzyl phthalate, dibutyl phthalate, 2,2-dimethyl-1,3-propanediol, 2-cyclohexylcyclohexanone, tricyclohexyl citrate, glycerol, dibutyl stearate, butyl phthalyl butyl glycolate, dibutyl sebacate, ethyl phthalyl, ethyl glycolate and glycol monooleate. When the packaging film is to be used for food products, the preferred plasticizers are those approved by the Food and Drug Administration which include acetyl tributyl citrate, acetyl triethyl citrate, butyl phthalyl butyl glycolate, butyl stearate, dibutyl sebacate, diethyl phthalate, ethyl phthalyl ethyl glycolate, glycol monooleate, glycerol triacetate and triethyl citrate.

Generally, the surface of a polyolefinic film is not receptive to such treatments as coating, printing, heat sealing, etc. This resistance is attributed to a buildup of amide and low molecular weight molecules and adjuvants used in the manufacture of the substrate. Therefore in order to obtain the necessary coating bond strength, the substrate must first be treated to remove or offset this surface condition which unless treated, results in an adhesive, cohesive or boundary layer failure. Any of the current methods acceptable to the art may be utilized, such as the oxidizing flame, electric arc, grit blasting, acid etching, etc., methods. Wolinski, in U.S. Patent 3,061,882, discusses this phenomenon and summarizes the known remedies.

In the coating process, according to the present invention, a solution of the copolymer, the plasticizer and adjuvant materials if such are to be used, is prepared using one or more of the common organic solvents known to those in the art such as methyl ethyl ketone, tetrahydrofuran, methyl isobutyl ketone, cellosolve acetate, diacetone alcohol, toluene, chloroform, acetone, cyclohexanone, methanol, butyl cellosolve acetate, trichloroethylene, ethanol, dimethyl formamide, methylene chloride, xylol, dioxane benzene and butyl acetate. The selection of the solvent system is important in obtaining optimum clarity. A system tending to produce the clearest coating is a 50/50 by volume mixture of ethylacetate and methyl ethyl ketone.

The solution nature of the present system offers unique handling and processing advantages to the trade. The solids content can be readily varied to meet the need for various types of coating methods. Those in the trade seem to prefer a solution having a solids content of about 15 to 35% by weight. By solids content it is meant the percent by weight of those components of the solutions which are not solvents, even though one or more of the other components, may be liquid under normal conditions. The solution system also provides for a facile incorporation therein of adjuvant materials such as pigments, dyes, delustrants, waxes, fillers, stabilizers, etc., when desired.

Application of the solution system is made to the surfaces of the polyolefin substrate on one or more sides thereof as desired so as to provide each surface being coated with a film which can be as low as 0.01 mil in thickness after the removal of the solvent therefrom. The thickness of the film may be varied by varying the viscosity of the formulation which is determined by the solids content solvent system and temperature. Thickness may also be varied by changing the application parameters and methods. The coatings may be applied by any of the commonly used dipping, brushing, roller coating, etc., techniques known to the art. After the coating solution is applied to the substrate the solvent is removed therefrom, preferably at elevated temperatures of up to 250° F. and forced draft conditions. The temperatures to be employed depend not only on the solvent and/or thickness of the desired coating but on the type of substrate involved, i.e., oriented film or cast objects. Oriented films require the use of the lowest temperatures since excessively high temperatures would destroy the orientation and properties derived from this orientation. When a treated polyolefin substrate is utilized, as described above, the copolymer system of the present invention forms a coating having good adhesion to the substrate without the use of anchoring agents. This adhesion remains good although the coated substrate is subjected to flexing or crinkling.

It can be readily seen, therefore, that the novel structures of the present invention provides those in the art with a versatile coating system and a product which has very important advantages over the uncoated substrate materials.

The following examples are merely illustrative of the present invention and are not intended as a limitation upon the scope thereof.

EXAMPLES 1–15

Among the vinylidene chloride copolymers which may be used to form part of the curable compositions useful in the practice of the present invention are those of vinylidene chloride ($VCl_2$) and acrylic acid (AA). Curable copolymers made from those monomers were prepared by solution polymerization as illustrated in Tables I and II below. They represent a wide range of compositions, produced using several solvent systems, e.g., solvent A=methylisobutylketone; solvent B=acetone; solvent C=1:1 vol./vol. mixture of acetone and toluene, solvent D=methyl ethyl ketone and several free radical polymerization initiators, e.g., initiator A=azobisisobutyronitrile; initiator B=benzoyl peroxide, under various polymerization conditions of temperature and time, to provide reactive copolymers at various percentages of conversion of the monomers. In preparing these copolymers, the respective initiators were dissolved in the solvent used and the monomers were then added to the initiator solution. The reactions were conducted under nitrogen in a sealed reaction vessel under autogenous pressure.

TABLE I

| Example | Charge, grams | | Charge, mol percent, $VCl_2$/AA | Initiator | | Solvent | |
|---|---|---|---|---|---|---|---|
| | $VCl_2$ | AA | | In grams | Type | In ml. | Type |
| 1 | 63 | 25 | 65/35 | 2 | A | 150 | A |
| 2 | 73 | 17 | 75/25 | 2 | A | 150 | A |
| 3 | 155 | 29.6 | 80/20 | 4 | A | 240 | A |
| 4 | 78 | 14 | 80/20 | 2 | A | 150 | A |
| 5 | 78 | 14.4 | 80/20 | 2 | A | 150 | A |
| 6 | 3,220 | 496 | 83/17 | 30 | A | 6,000 | D |
| 7 | 161 | 25 | 83/17 | 4 | A | 300 | A |
| 8 | 161 | 24.5 | 83/17 | 4 | A | 300 | C |
| 9 | 161 | 24.5 | 83/17 | 4 | A | 300 | D |
| 10 | 161 | 24.5 | 83/17 | 6 | B | 300 | C |
| 11 | 161 | 24.5 | 83/17 | 6 | B | 300 | D |
| 12 | 83 | 10.8 | 85/15 | 2 | A | 150 | A |
| 13 | 83 | 10.8 | 85/15 | 2 | A | 150 | A |
| 14 | 171 | 17 | 88/12 | 4 | A | 300 | A |
| 15 | 87 | 7.2 | 90/10 | 2 | A | 150 | A |

TABLE II

| Example | Reaction | | | Resin product | |
|---|---|---|---|---|---|
| | Time, hrs. | Temp., °C. | Conversion, percent | Mol percent VCl₂/AA | Gram eq. COOH/ 100 grams resin |
| 1 | 5 | 60 | 57 | 72/28 | 0.32 |
| 2 | 4 | 60 | | 79/21 | 0.22 |
| 3 | 16 | 65 | 85 | 82/18 | 0.19 |
| 4 | 4 | 60 | 32 | 83/17 | 0.18 |
| 5 | 17 | 60 | 85 | 83/17 | 0.19 |
| 6 | 6 | 65 | 61 | 83.9/16.1 | 0.173 |
| 7 | 3 | 65 | 53 | 84/16 | 0.17 |
| 8 | 5 | 65 | 63 | 84/16 | 0.17 |
| 9 | 5 | 65 | 61 | 85/15 | 0.161 |
| 10 | 5 | 65 | 33 | 85/15 | 0.161 |
| 11 | 5 | 65 | 38 | 86/14 | 0.149 |
| 12 | 4 | 60 | 33 | 87/13 | 0.13 |
| 13 | 1 | 85 | 55 | 87/13 | 0.14 |
| 14 | 3 | 65 | 55 | 90/10 | 0.11 |
| 15 | 1 | 85 | 56 | 91/9 | 0.10 |

EXAMPLES 16–19

In the following examples, biaxially oriented polypropylene film, previously surface treated by the electronic discharge (corona) method, was coated with a copolymer of vinylidene chloride and acrylic acid prepared as indicated in Example 13. The copolymer and plasticizer were dissolved in the solvent system and hand coated on the polypropylene film to give a wet film thickness of approximately 3 mils. Drying times were as indicated in Table III below. The following tests were applied to the coated film:

Adhesion—"Cellophane Tape Test."—A seven inch strip of adhesive cellophane tape was applied to the coated surface of the oriented polypropylene film so that one inch of the adhesive tape remained free. The first three inches of applied tape were pulled away from the film slowly, at an angle of 180°. The second three inches of applied tape were pulled rapidly away from the film. Delamination of the coating from the film indicated poor adhesion, otherwise it was considered good or if slight delamination occurred then adhesion was considered fair. If the substrate surrounding the cellophane tape tore, the celophane tape was peeled from the sample and checked for tackiness. Adhesion was considered good if the tape retained its tackiness indicating that the coating did not delaminate from the substrate and adhere to the cellophane tape.

Heat Seal Test.—A "Sealine" Model 50 hand heat sealer was employed. Each sample of film, which was coated on one side only, was tested for heat sealability in two ways; by attempting to join the coated side to the coated side and then the coated side to the uncoated side. Film previously treated on both sides was employed in all tests. The seal was effected by rolling the sealer over the abutting films. When an attempt was made to separate the films, if the film surrounding the heat seal tore before the heat seal bond failed, the seal was considered positive.

The copolymer and plasticizer were dissolved in the solvent and coated on biaxially oriented polypropylene film as outlined in Examples 16–19. The adhesion and heat seal tests were conducted as outlined in these previous examples except that a Sentinel Model 12AS heat sealer was used. In all cases the adhesion was good and heat sealability was positive.

TABLE IV

| Example: | Plasticizer |
|---|---|
| 20 | Glycerol triacetate. |
| 21 | Monocresyl diphenyl phosphate. |
| 22 | Butyl benzyl phthalate. |
| 23 | Dibutyl phthalate. |
| 24 | 2-2-dimethyl-1,3-propanediol. |
| 25 | 2-cyclohexylcyclohexanone. |
| 26 | Tricyclohexyl citrate. |
| 27 | Glycerol. |
| 28 | Dibutyl stearate. |
| 29 | Butyl phthalyl butyl glycolate. |

We claim:

1. Heat-sealable polyolefin films capable of being heat sealed without substantially altering the molecular orientation of the polyolefin in such films and consisting essentially of
   (a) an oriented film of a polyolefin; and
   (b) a thin layer of a coating composition bonded to and completely covering at least one surface of the oriented polyolefin film and consisting essentially of (i) from about 80 to 99 percent by weight of a vinylidene chloride copolymer derived from the interpolymerization of from 75 to 95 mole percent of vinylidene chloride and from 5 to 25 mole percent of an α,β-unsaturated carboxylic acid, and (ii) from about 1 to 20 percent by weight of a plasticizer for the vinylidene chloride copolymer, the coating composition being characterized by a softening point lower than that of the oriented polyolefin film.

2. Heat-sealable polyolefin films according to claim 1, in which the plasticizer is selected from the group consisting of acetyl tributyl citrate, triethyl citrate, dioctyl sebacate, dioctyl phthalate, glycerol triacetate, acetyl triethyl citrate, monocresyl diphenyl phosphate, butyl benzyl phthalate, dibutyl phthalate, 2,2-dimethyl 1,3-propane-

TABLE III

| Example | 16 | 17 | 18 | 19 |
|---|---|---|---|---|
| Copolymer | 10.0 g | 10.0 g | 10.0 g | 10.0 g. |
| Triethyl citrate | 0.12 g | | | |
| Acetyl tributyl citrate | | 0.12 g | | |
| Dioctyl sebacate | | | 0.12 g | |
| Dioctyl phthalate | | | | 0.12 g. |
| Toluene | 33.0 g | 33.0 g | 33.0 g | 33.0 g. |
| Ethyl acetate | 33.0 g | 33.0 g | 33.0 g | 33.0 g. |
| Drying conditions | 1 min. at 185° F | 1 min. at 185° F | 1 min. at 250° F | 1 min. at 250° F. |
| Percent solids | 15 | 15 | 15 | 15. |
| Adhesion | Fair | Fair | Good | Good. |
| Heat seal results | Positive | Positive | Positive | Positive. |

EXAMPLES 20–29

Table IV lists various plasticizers which were combined with a copolymer of vinylidene chloride and acrylic acid prepared as outlined in Example 13. The following base formulation was employed:

| | Grams |
|---|---|
| Copolymer | 100 |
| Plasticizer | 18 |
| Methyl ethyl ketone | 35 | diol, 2 - cyclohexylcyclohexanone, tricyclohexyl citrate, glycerol, dibutyl stearate, butyl phthalyl butyl glycolate, dibutyl sebacate, ethyl phthalyl, ethyl glycolate, glycol monooleate, dibutyl sebacate and diethyl phthalate.

3. Heat-sealable polyolefin films according to claim 1, in which the vinylidene chloride copolymer is derived from the interpolymerization of from 75 to 95 mole percent of vinylidene chloride and from 5 to 25 mole percent of at least one $\alpha,\beta$-unsaturated carboxylic acid selected from the group consisting of acrylic acid, methacrylic acid, itaconic acid, and crotonic acid.

4. Heat-sealable polyolefin films according to claim 1, in which the vinylidene chloride copolymer is derived from the interpolymerization of about 85 mole percent of vinylidene chloride and about 15 mole percent of acrylic acid.

5. Heat-sealable polyolefin films according to claim 1, in which the polyolefin is polyethylene.

6. Heat-sealable polyolefin films according to claim 1, in which the polyolefin is polypropylene.

References Cited

UNITED STATES PATENTS

| | | | |
|---|---|---|---|
| 2,748,027 | 5/1956 | Meier | 117—138.8 |
| 2,786,780 | 3/1957 | Walles et al. | 117—138.8 X |
| 2,824,025 | 2/1958 | McIntire | 117—161 |
| 2,840,491 | 6/1958 | Grenley et al. | 117—138.8 |
| 3,057,752 | 10/1962 | Covington et al | 117—138.8 X |
| 3,202,528 | 8/1965 | James | 117—138.8 X |
| 3,222,211 | 12/1965 | Updegrove et al. | 117—138.8 X |
| 2,853,404 | 9/1958 | Weinberg | 117—122 |
| 3,104,979 | 9/1963 | Lawton et al. | 117—122 |
| 3,262,808 | 7/1966 | Crooks et al. | 117—138.8 |

FOREIGN PATENTS

| | | |
|---|---|---|
| 615,602 | 2/1961 | Canada. |
| 836,793 | 6/1960 | Great Britain. |

WILLIAM D. MARTIN, *Primary Examiner.*

R. HUSACK, *Assistant Examiner.*